(12) United States Patent
Ulrey et al.

(10) Patent No.: US 10,375,764 B2
(45) Date of Patent: Aug. 6, 2019

(54) SYSTEMS AND METHODS FOR VEHICLE LOAD CURRENT DETECTION AND CONTROL

(71) Applicant: Ford Global Technologies, LLC, Dearborn, MI (US)

(72) Inventors: Joseph Norman Ulrey, Dearborn, MI (US); Michael James Uhrich, Wixom, MI (US); Ross Dykstra Pursifull, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 113 days.

(21) Appl. No.: 15/725,118

(22) Filed: Oct. 4, 2017

(65) Prior Publication Data

US 2019/0104567 A1    Apr. 4, 2019

(51) Int. Cl.
*H05B 1/02* (2006.01)
*G01K 7/16* (2006.01)
*B60R 16/03* (2006.01)

(52) U.S. Cl.
CPC ........... *H05B 1/0238* (2013.01); *B60R 16/03* (2013.01); *G01K 7/16* (2013.01)

(58) Field of Classification Search
CPC ......... H05B 1/0238; B60R 16/03; G01K 7/16
See application file for complete search history.

(56) References Cited

U.S. PATENT DOCUMENTS

| | | |
|---|---|---|
| 5,337,013 A | 8/1994 | Langer et al. |
| 5,857,325 A | 1/1999 | Shimasaki et al. |
| 8,207,698 B2 | 6/2012 | Xiang |
| 9,081,039 B2 | 7/2015 | Julson et al. |
| 9,257,926 B2 | 2/2016 | Pettigrew et al. |

FOREIGN PATENT DOCUMENTS

JP         4665340 B2    1/2011

*Primary Examiner* — Robert L Deberadinis
(74) *Attorney, Agent, or Firm* — Frank Lollo; Neal, Gerber & Eisenberg LLP; James P. Muraff

(57) ABSTRACT

Method and apparatus are disclosed for determining and controlling a vehicle load current and temperature through the use of a common current sensor. An example vehicle includes a power source, an electrical sensor configured to detect a total current provided by the power source to a plurality of electrical loads, and a processor. The a processor is configured to determine a target load temperature based on the total current, and set a voltage duty cycle of the target load to maintain the target load temperature.

18 Claims, 4 Drawing Sheets

SYSTEMS AND METHODS FOR VEHICLE LOAD CURRENT DETECTION AND CONTROL

TECHNICAL FIELD

The present disclosure generally relates to vehicle electronics and, more specifically, systems and methods for vehicle load current detection and control using a common current sensor.

BACKGROUND

Many modern vehicles include electronic systems that can be used for powertrain control, comfort, safety, and convenience. Examples may include various power circuits, heaters, actuators, valves, pressure regulators, and more. Operational information about these systems may be gathered in order to control the systems (i.e., feedback), as well as to ensure that they are operating properly.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown describing systems, apparatuses, and methods for detecting current drawn by one of a plurality of electrical loads operating in a vehicle, and controlling a temperature of the electrical load. An example disclosed vehicle includes a power source, an electrical sensor configured to detect a total current provided by the power source to a plurality of electrical loads, and a processor. The processor is configured to determine a target load temperature based on the total current, and set a voltage duty cycle of the target load to maintain the target load temperature.

An example disclosed method includes determining, by a vehicle processor, a total current provided to a plurality of electrical loads coupled to a vehicle power source. The method also includes determining, by the vehicle processor, a target load of the plurality of electrical loads. The method further includes determining, by the vehicle processor, a target load temperature based on the total current provided to the plurality of electrical loads. And the method yet further includes setting a voltage duty cycle of the target load to maintain the target load temperature.

A third example may include means for determining a total current provided to a plurality of electrical loads coupled to a vehicle power source. The third example also includes means for determining a target load of the plurality of electrical loads. The third example further includes means for determining a target load temperature based on the total current provided to the plurality of electrical loads. And the third example still further includes means for setting a voltage duty cycle of the target load to maintain the target load temperature.

A fourth example may include current control of motors and solenoids. A motor's torque may be proportional to its electrical current. A solenoid's force may depend on its electrical current. These devices can work over a temperature range, and each device's resistance may change with temperature. By implementing a current feedback system, current can be controlled to a target current over a range of device temperatures. A repeatable current results in a repeatable torque or force, which can be beneficial for actuator control, etc. Some actuators are electrical power sensitive instead of current sensitive, but a current measurement may still be required for computing electrical power. Electrical power can therefore be used as a feedback (e.g. in-tank fuel pump control), but only if a measurement of both current and applied voltage (or duty cycled voltage) are known.

A fifth example may include diagnostics. With knowledge of the applied voltage and resulting current, the temperature of the electrical conductors of the electrical load can be inferred (e.g., windings, resistive heating elements). The expected temperature can be compared to the computed temperature (resistance changes with temperature) as a diagnostic. Also, the resistance can be compared to the expected resistance. And the current level can be compared to the expected current level to diagnose a load.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
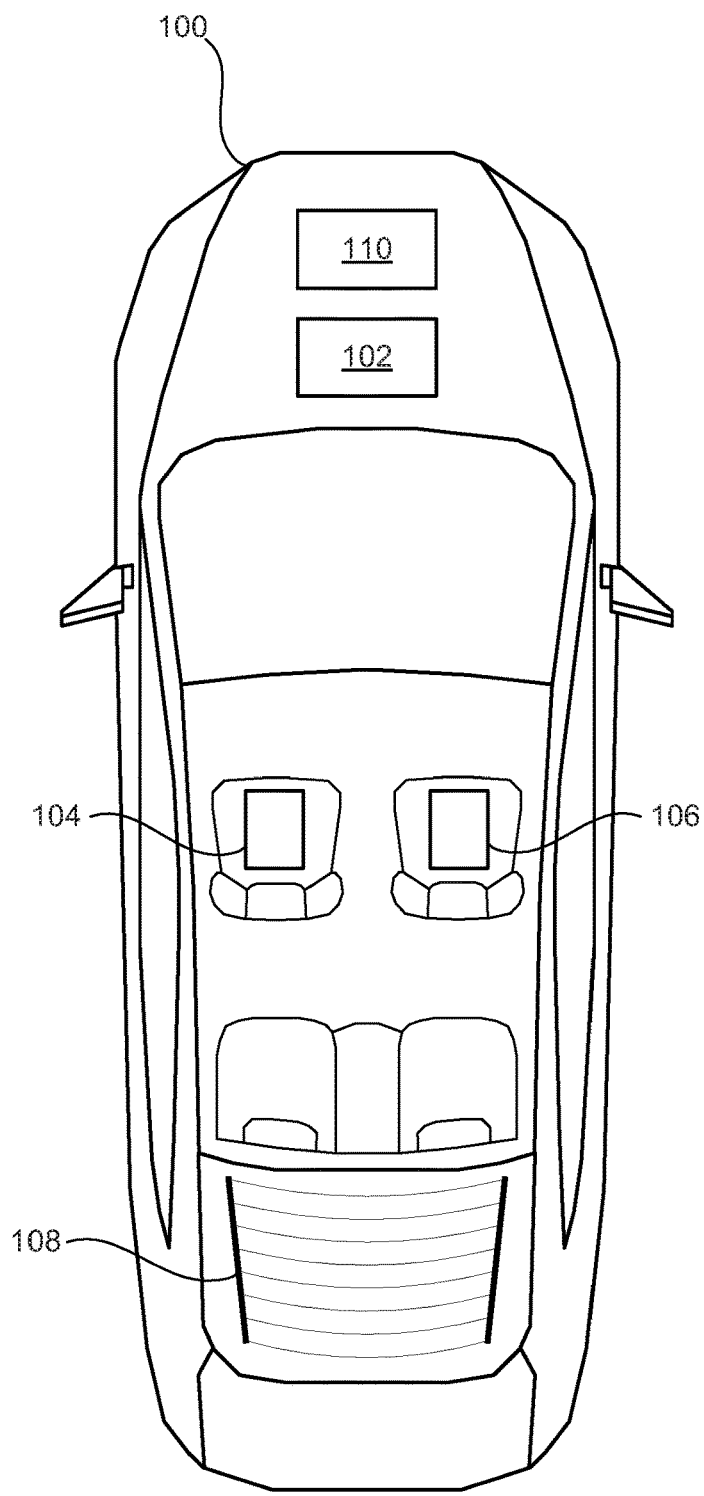
FIG. 1 illustrates an example vehicle according to embodiments of the present disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

As noted above, vehicles may include one or more electrical systems or devices, otherwise known as electrical loads. The electrical loads may be related to vehicle safety, comfort, convenience, and more, and can include powered windows, heated seats, entertainment systems, defrosting or defogging circuits, fans, pumps, and more. One or more of the electrical loads may be driven with a voltage, which may have a corresponding duty cycle. It may be beneficial for one or more vehicle control systems to gather data related to the electrical load's usage, voltage, current, resistance, temperature, and more, so that the control system can exert control over the electrical load and determine when the load is operating within its specification. The data about the electrical loads may be used to maintain proper operation, and/or to control one or more aspects of the electrical load operation (e.g., change a voltage, current, resistance, temperature, power, etc.).

Some vehicles may include a plurality of sensors dedicated to each electrical load. These sensors may provide data specific to a given load. Where there are a plurality of loads, the vehicle may require many sensors, which can increase manufacturing costs and increase the number of possible points of failure.

With these issues in mind, embodiments disclosed herein may provide systems, methods, and devices configured such that a centralized or common current sensor configured to measure a total current of all loads can be used to gather information relating to the plurality of electrical loads, and can enable a single target load to be selected from the plurality and analyzed without the need for individual current sensors on each electrical load. Further, embodiments described herein may enable control of a voltage and/or current provided to the target electrical load such that a target current, voltage, temperature, and/or one or more other target characteristics can be controlled, maintained, or otherwise modified.

In one example, the target electrical load may be a driver's side seat heating circuit. An example processor may be able to determine a current provided to the seat heating circuit by measuring a total current output by the vehicle power source while the seat heating circuit is (1) on and (2) while it is off. If no other loads are changed during this measurement, the difference in current may be ascribed to the seat heating circuit, which can correlate to a temperature of the seat heating circuit. The temperature can be determined based on a known resistance of the circuit. Then, the processor may use the determined information in order to maintain a target or intended temperature, or to determine whether the seat heating circuit is malfunctioning or is outside a threshold range included in a component specification. The processor can then set a voltage duty cycle of the seat heating circuit in order to maintain the target temperature or to increase/decrease the temperature depending on the situation.

FIG. 1 illustrates an example vehicle 100 according to embodiments of the present disclosure. Vehicle 100 may be a standard gasoline powered vehicle, a hybrid vehicle, an electric vehicle, a fuel cell vehicle, or any other mobility implement type of vehicle. Vehicle 100 may be non-autonomous, semi-autonomous, or autonomous. Vehicle 100 may include parts related to mobility, such as a powertrain with an engine, a transmission, a suspension, a driveshaft, and/or wheels, etc. In the illustrated example, vehicle 100 may include one or more electronic components (described below with respect to FIG. 2).

As shown in FIG. 1, vehicle 100 may include a power source 102, a plurality of electrical loads 104, 106, and 108, and a processor 110. Vehicle 100 may include one or more additional electronic components, described in further detail with respect to FIG. 2.

Power source 102 may include a battery, an alternator, and/or one or more other electrical generation or storage devices. The battery may be low voltage or high voltage, may include one cell or may include a plurality of cells, and may be located in one position within the vehicle or may be distributed throughout. Further, in some example the battery may be a battery system that comprises two or more batteries (e.g., a low voltage battery and a high voltage battery configured to provide power to respective subsets of the plurality of loads. The alternator may be a generator coupled to an engine of the vehicle, configured to provide power when the vehicle is on and the engine is running.

FIG. 1 illustrates three example electrical loads, including seat heating circuits 104 and 106, and a rear defrosting circuit 108. other loads are possible as well.

The power source 102 may be coupled to or may include one or more electrical sensors configured to measure a current, voltage, and/or other characteristic corresponding to the power source. For instance, one or more sensors may be configured to measure a total current provided by the power source 102. As such, in some examples this may include a first current sensor coupled to the battery, and a second current sensor coupled to the alternator. The total current may thus be determined by combining the output from the first and second current sensors. This is described in further detail with respect to FIG. 3.

In some examples, the current drawn by a particular electrical load may be determined based on data from the current sensor(s) coupled to the power source. Instead of having a current sensor coupled to each load individually, a common current sensor coupled to the power source may be used to determine the current drawn by any of the coupled electrical loads.

In order to determine a current drawn by a particular target load, the total current drawn by all connected loads may be analyzed. The total current measurement may be a signal that changes over time, and may include the total current provided by the power source to the plurality of electrical loads. The signal may change based on the makeup of the connected and turned on loads, such that when one or more loads is connected, turned on or off, and/or otherwise changes a state, the total current signal may be changed.

A difference in the total current measured when the target load is turned on versus when it is turned off can provide a value that corresponds to the current drawn by the target load.

In some examples, processor 110 may receive a control signal for one or more loads, including the target load. The control may be used to determine the point in time at which the target load is turned on or turned off, which call allow the processor 110 to determine the total current signal at each point in time such that the current particular to the target load can be determined.

In some examples, the control signal for a target load may be initiated by a user (e.g., hitting a button, activating the defroster, heated seats, windows, etc). In other examples, the control signal may be automated, such as a signal controlling a cooling fan, fuel pump, etc. (i.e., without human input).

Any electrical load of the vehicle 100 that includes a control signal that can be received by the processor may be selected as a target load. And as such, the processor 110 can determine a current drawn by any load having a control signal, provided the current drawn is larger than a noise floor level. Thus, one benefit of the present disclosure is that a sensor detecting current provided to all loads can be used to determine the current directed to a specific target load without the need for individual current sensors on the target load.

When a current directed to or drawn by a particular load is known, the current can be analyzed in combination with a voltage applied to the load in order to determine a load resistance. The current, voltage, and resistance will adhere to the classical law $V=I \times R$, wherein V is the voltage, I is the current, and R is the resistance.

If the load is purely resistive, the instantaneous current may be equal to the steady state current measurement. However a capacitive or inductive load may have a transient current value different than the steady state value. In this case, one may need to wait 2 to 3 time constants after the load is switched on or off to take the current measurement.

When the resistance of the load is known, a corresponding temperature can be determined as well. A given load may have a first resistance when the vehicle and/or load is cold (i.e., in a steady state where the vehicle and/or load has been turned off for a period of time). As the vehicle and/or load is operated, the temperature of the load may change, thereby changing the load resistance. This is particularly apparent for a seat heating circuit such as loads 104 and 106, and a rear defrosting circuit such as load 108. A second measured resistance may be compared to the first resistance, and a corresponding change in temperature may be determined.

In some examples, processor 110 may determine a load temperature based on a lookup table. For instance, rear defrosting circuit 108 may be analyzed during manufacturing to determine a baseline resistance and temperature. Circuit 108 may then be tested under various conditions to determine a response of the circuit and an equation that correlates the circuit resistance R with a temperature of the circuit.

When the temperature of the target load is known, the processor 110 may then be configured to set a voltage duty cycle of the target load to maintain the target load temperature and/or to modify the target load temperature to an expected, intended, or other temperature. For instance, where the target load temperature is determined to be 100 degrees Fahrenheit, the processor may be configured to set, change, or modify a voltage duty cycle of the target load to maintain the temperature at 100 degrees. Should the temperature increase over the course of time due to continued operation of the circuit, the processor 110 may be configured to reduce the voltage duty cycle of the target load in response, in order to drive the temperature down back to 100 degrees. Similarly, if the determined target load temperature drops below 100 degrees, the processor 110 may be configured to increase the duty cycle in order to drive the temperature back up to 100 degrees.

In some examples the processor may determine an intended or goal target load temperature. This intended temperature may be a temperature at which the target load should operate, and the processor 110 may control the voltage duty cycle in order to cause the target load temperature to reach the intended temperature. For instance, an intended temperature of operation of a heated seat may be 100 degrees. If the target load temperature is determined to be 95 degrees, the processor may then be configured to increase the voltage duty cycle in order to drive the target load temperature up to the intended temperature.

Further, the intended or goal target load temperature may be a range of temperatures (e.g., 95-100 degrees). In this case, the processor 110 may be configured to bring the temperature into the range if the target load temperature is determined to be outside this range.

In some examples, the processor may determine an expected temperature for a given load, based on one or more operational characteristics. For instance, the expected temperature may be a threshold within which the load is expected to operate or function according to manufacturing tolerances and/or specifications. A temperature range for a heated seat circuit may have a maximum limit of 105 degrees Fahrenheit before it will cause injury to a passenger. Based on the determined target load temperature and the expected temperature of less than 105 degrees, the processor may take one or more actions, such as turning off the target load, reducing or increasing a voltage duty cycle, providing an alert, or more. This may provide added safety by preventing one or more loads from overheating.

Figure 2:
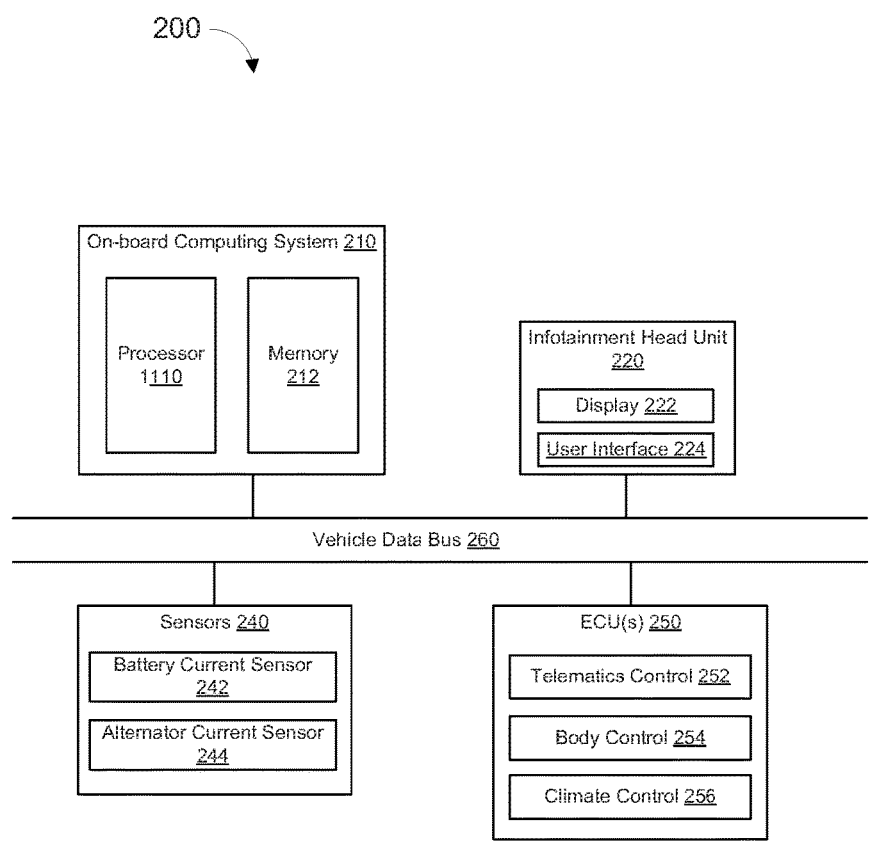
FIG. 2 illustrates an example block diagram of electronic components of the vehicle of FIG. 1.

FIG. 2 illustrates an example block diagram 200 showing electronic components of vehicle 100, according to some embodiments. In the illustrated example, the electronic components 200 include the on-board computing system 210, infotainment head unit 220, sensors 240, electronic control unit(s) 250, and vehicle data bus 260.

The on-board computing system 210 may include a microcontroller unit, controller or processor 110 and memory 212. Processor 110 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 212 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory 212 includes multiple kinds of memory, particularly volatile memory and non-volatile memory.

The memory 212 may be computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 212, the computer readable medium, and/or within the processor 110 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The infotainment head unit 220 may provide an interface between vehicle 100 and a user. The infotainment head unit 220 may include a user interface 224 having one or more input and/or output devices. The input devices may include, for example, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices), actuators, a heads-up display, a center console display (e.g., a liquid crystal display (LCD), an organic light emitting diode (OLED) display, a flat panel display, a solid state display, etc.), and/or speakers. In the illustrated example, the infotainment head unit 220 includes hardware (e.g., a processor or controller, memory, storage, etc.) and software (e.g., an operating system, etc.) for an infotainment system (such as SYNC® and MyFord Touch® by Ford®, Entune® by Toyota®, IntelliLink® by GMC®, etc.). In some examples the infotainment head unit 220 may share a processor with on-board computing system 210. Additionally, the infotainment head unit 220 may display the infotainment system on, for example, a center console display 222 of vehicle 100.

Sensors 240 may be arranged in and around the vehicle 100 in any suitable fashion. In the illustrated example, sensors 240 include a battery current sensor 242 and an alternator current sensor 244. Other sensors may be included as well.

The ECUs 250 may monitor and control subsystems of vehicle 100. ECUs 250 may communicate and exchange information via vehicle data bus 260. Additionally, ECUs 250 may communicate properties (such as, status of the ECU 250, sensor readings, control state, error and diagnostic codes, etc.) to and/or receive requests from other ECUs 250. Some vehicles 100 may have seventy or more ECUs 250 located in various locations around the vehicle 100 communicatively coupled by vehicle data bus 260. ECUs 250 may be discrete sets of electronics that include their own circuit(s) (such as integrated circuits, microprocessors, memory, storage, etc.) and firmware, sensors, actuators, and/or mounting hardware. In the illustrated example, ECUs 250 may include the telematics control unit 252, the body control unit 254, and the climate control unit 256.

The telematics control unit 252 may control tracking of the vehicle 100, for example, using data received by a GPS receiver and/or one or more sensors. The body control unit 254 may control various subsystems of the vehicle 100. For example, the body control unit 254 may control power a trunk latch, windows, power locks, power moon roof control, an immobilizer system, and/or power mirrors, etc. The climate control unit 256 may control the speed, temperature, and volume of air coming out of one or more vents. The climate control unit 256 may also detect the blower speed (and other signals) and transmit to the on-board computing system 210 via data bus 260. Other ECUs are possible as well.

Vehicle data bus 260 may include one or more data buses that communicatively couple the on-board computing system 210, infotainment head unit 220, sensors 240, ECUs 250, and other devices or systems connected to the vehicle data bus 260. In some examples, vehicle data bus 260 may be implemented in accordance with the controller area network (CAN) bus protocol as defined by International Standards Organization (ISO) 11898-1. Alternatively, in some examples, vehicle data bus 260 may be a Media Oriented Systems Transport (MOST) bus, or a CAN flexible data (CAN-FD) bus (ISO 11898-7).

Figure 3:
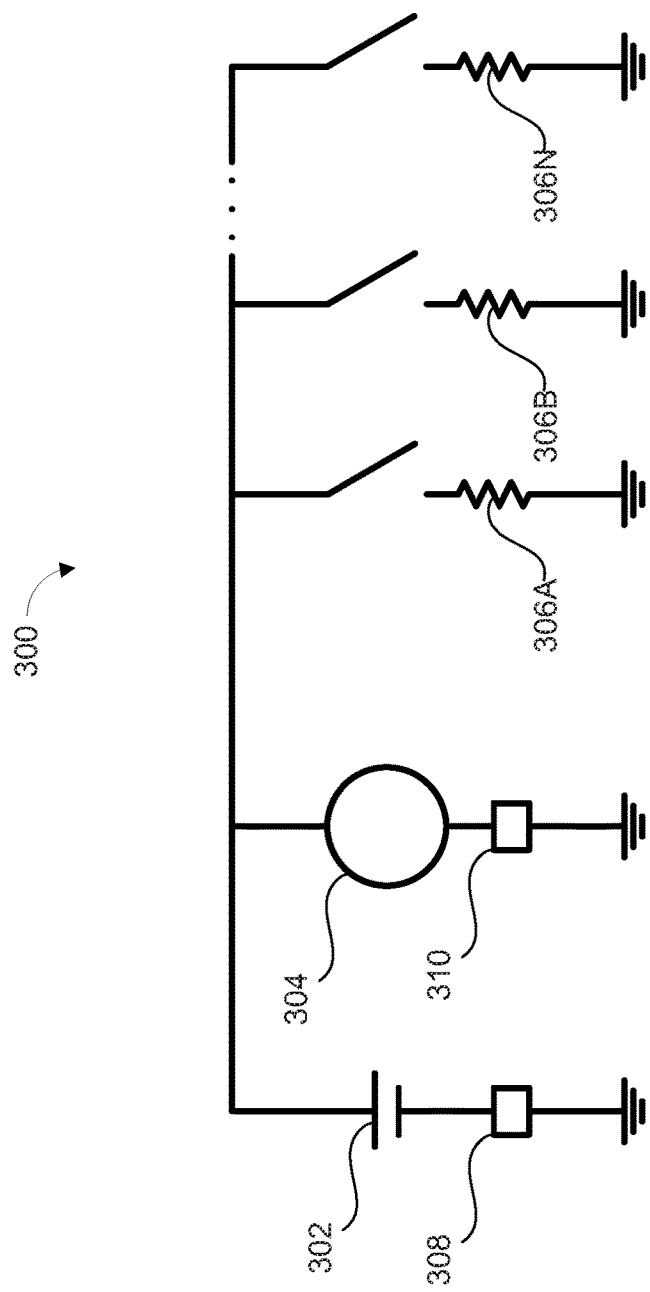
FIG. 3 illustrates a simplified generic automotive power scheme according to embodiments of the present disclosure.

FIG. 3 illustrates a simplified generic automotive power scheme 300 according to embodiments of the present disclosure. Scheme 300 illustrates that the power source may include a battery 302 and an alternator 304 of the vehicle. Further, a plurality of electrical loads 306A-306N may be electrically coupled to the power source.

Scheme 300 also illustrates that in some examples there may be a current sensor 308 coupled to the battery 302 and configured to measure a first current supplied by the battery 302. There may also be a second current sensor 310 coupled to the alternator 310 and configured to determine a second current supplied to the plurality of loads 306A-306N by the alternator 304. The total current provided by the power source may be the combination of the first current and the second current measured by current sensors 308 and 310. Any change in this total current measurement may be affected by one or more of the loads 306A-306N turning on or off, or changing states.

Figure 4:
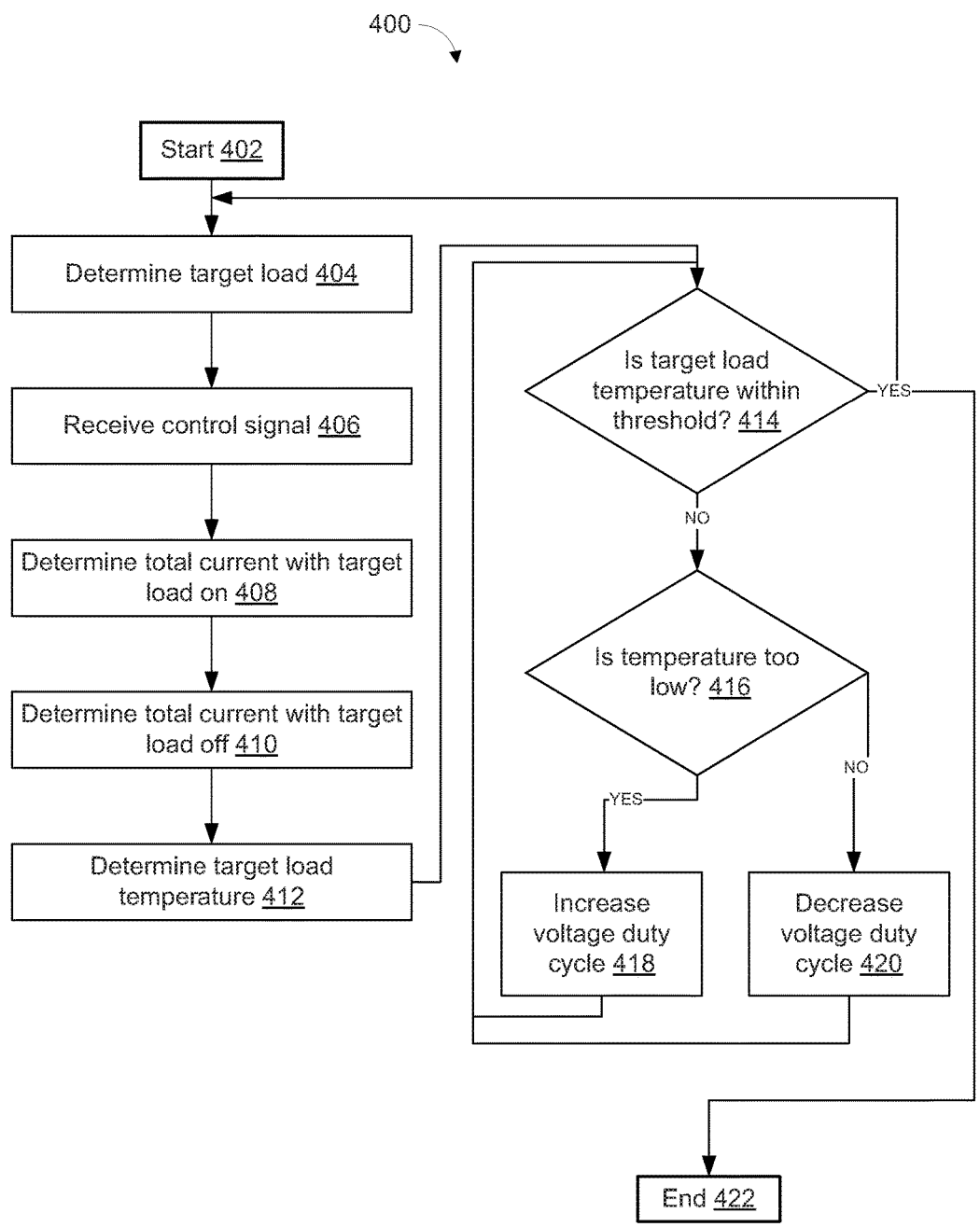
FIG. 4 illustrates a flowchart of an example method according to embodiments of the present disclosure.

FIG. 4 illustrates a flowchart of an example method 400 according to embodiments of the present disclosure. Method 400 may enable a vehicle processor to determine a current drawn by a target load based on a change in the total current provided by the vehicle power source, and to control a temperature of the target load based on that information. The flowchart of FIG. 4 is representative of machine readable instructions that are stored in memory (such as memory 212) and may include one or more programs which, when executed by a processor (such as processor 110) may cause vehicle 100 and/or one or more systems or devices to carry out one or more functions described herein. While the example program is described with reference to the flowchart illustrated in FIG. 4, many other methods for carrying out the functions described herein may alternatively be used. For example, the order of execution of the blocks may be rearranged or performed in series or parallel with each other, blocks may be changed, eliminated, and/or combined to perform method 400. Further, because method 400 is disclosed in connection with the components of FIGS. 1-3, some functions of those components will not be described in detail below.

Method 400 may start at block 402. At block 404, method 400 may include determining a target load. This may be done by a vehicle processor, and may include selecting a target load from a plurality of loads.

At block 406, method 400 may include receiving a control signal. The control signal may be received by the vehicle processor, and may correspond to the target load. In some cases, the control signal may be a signal that indicates a point in time at which the target load turns on or off.

At block 408, method 400 may include determining a total current provided by the vehicle power source with the target load turned on. Block 410 may include determining a total current provided by the vehicle power source with the target load turned off. The difference between these two values may be the current drawn by the target load. As such, the order of blocks 408 and 410 may be reversed, especially in the even the control signal indicates that the target load has gone from an off position to an on position.

At block 412, method 400 may include determining a target load temperature. The target load temperature may correspond to a resistance of the target load, which can be determined based on a known voltage and current provided to the target load.

At block 414, method 400 may include determining whether the target load temperature is within a threshold. The threshold may be specific to the particular target load, and as such one or more target loads may have different respective thresholds.

In some examples the threshold may be a threshold range. If the determined target load temperature is outside the threshold range, method 400 may include determining whether the target load temperature is too low, or is below the threshold range at block 416. However if the target load temperature is within the threshold, method 400 may include returning to block 404.

At block 416, if the determined target load temperature is below the threshold, method 400 may include modifying the target load temperature load by increasing the voltage duty cycle of the target load at block 418. Alternatively, if the target load temperature is above the threshold (i.e., not too low), method 400 may include decreasing the voltage duty cycle of the target load at block 420. The method may then return to block 414 to determine whether the target load temperature is within the threshold or not. Method 400 may then end at block 422.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
    a power source;
    an electrical sensor configured to detect a total current provided by the power source to a plurality of electrical loads; and
    a processor configured to:
        determine a target load temperature of a target load based on the total current; and
        set a voltage duty cycle of the target load to maintain the target load temperature.

2. The vehicle of claim 1, wherein the power source comprises a battery and an alternator.

3. The vehicle of claim 2, wherein the electrical sensor comprises:
    a first electrical sensor configured to detect a first current provided by the battery; and
    a second electrical sensor configured to detect a second current provided by the alternator,
    wherein the total current provided by the power source comprises a combination of the first current and the second current.

4. The vehicle of claim 1, wherein the processor is configured to determine the target load temperature by:
    determining a first total current when the target load is on;
    determining a second total current when the target load is off; and
    determining the target load temperature based on a difference between the first total current and the second total current.

5. The vehicle of claim 4, wherein the processor is further configured to receive a control signal corresponding to the target load.

6. The vehicle of claim 5, wherein the control signal indicates whether the target load is on or off.

7. The vehicle of claim 1, wherein the processor is further configured to:
    compare the target load temperature to an expected temperature; and
    set the voltage duty cycle of the target load based on both the target load temperature and the expected temperature.

8. The vehicle of claim 7, wherein the processor is further configured to:
    determine that the target load temperature is less than the expected temperature; and
    responsively increase the voltage duty cycle of the target load.

9. The vehicle of claim 1, wherein the target load comprises a heating circuit of a vehicle seat.

10. A method comprising:
    determining, by a vehicle processor, a total current provided to a plurality of electrical loads coupled to a vehicle power source;
    determining, by the vehicle processor, a target load of the plurality of electrical loads;
    determining, by the vehicle processor, a target load temperature based on the total current provided to the plurality of electrical loads; and
    setting a voltage duty cycle of the target load to maintain the target load temperature.

11. The method of claim 10, wherein the vehicle power source comprises a battery and an alternator.

12. The method of claim 11, wherein determining the total current comprises:
    determining a first current provided by the battery; and
    determining a second current provided by the alternator,
    wherein the total current provided by the vehicle power source comprises a combination of the first current and the second current.

13. The method of claim 10, wherein determining the target load temperature comprises:
    determining a first total current when the target load is on;
    determining a second total current when the target load is off; and
    determining the target load temperature based on a difference between the first total current and the second total current.

14. The method of claim 13, further comprising receiving a control signal corresponding to the target load.

15. The method of claim 14, wherein the control signal indicates whether the target load is on or off.

16. The method of claim 10, further comprising:
    comparing the target load temperature to an expected temperature; and
    setting the voltage duty cycle of the target load based on both the target load temperature and the expected temperature.

17. The method of claim 16, further comprising:
    determining that the target load temperature is less than the expected temperature; and
    responsively increasing the voltage duty cycle of the target load.

18. The method of claim 16, wherein the target load comprises a heating circuit of a vehicle seat.

* * * * *